United States Patent [19]

Walters, Jr. et al.

[11] Patent Number: 4,761,567
[45] Date of Patent: Aug. 2, 1988

[54] CLOCK SCHEME FOR VLSI SYSTEMS

[75] Inventors: Donald M. Walters, Jr.; Gigy Baror, both of Austin, Tex.

[73] Assignee: Advanced Micro Devices, Inc., Sunnyvale, Calif.

[21] Appl. No.: 52,623

[22] Filed: May 20, 1987

[51] Int. Cl.[4] ............... H03K 3/66; H03K 5/15
[52] U.S. Cl. ........................... 307/269; 307/475; 307/303; 307/470; 307/480; 328/60; 328/63
[58] Field of Search ............ 307/269, 470, 480, 441, 307/219, 303, 303.1; 328/60, 61, 63; 307/475

[56] References Cited

U.S. PATENT DOCUMENTS

| | | | |
|---|---|---|---|
| 4,409,671 | 10/1983 | Daniels et al. | 307/269 |
| 4,527,079 | 7/1985 | Thompson | 307/475 |
| 4,578,601 | 3/1986 | McAlister et al. | 307/269 |
| 4,683,384 | 7/1987 | Shibata et al. | 307/475 |
| 4,691,124 | 9/1987 | Ledzius et al. | 307/269 |
| 4,691,126 | 9/1987 | Splett et al. | 307/441 |
| 4,697,095 | 9/1987 | Fijii | 307/303 |

OTHER PUBLICATIONS

Zem et al.–"GTI-742 Camac Clock Pulse Generator", Instrum. and Exp. Tech (U.S.A.), vol. 20, No. 3, Nov. 1977, pp. 699–701.

Primary Examiner—John S. Heyman
Assistant Examiner—Tai Van Duong
Attorney, Agent, or Firm—Patrick T. King; Davis Chin; J. Vincent Tortolano

[57] ABSTRACT

An integrated circuit includes an input clock generator circuit responsive to an external TTL level clock signal for generating an internal CMOS level system clock signal for its own use and for use by other integrated circuits. The integrated circuit also includes an internal clock generator circuit responsive to either the internal CMOS level system clock signal or an external CMOS level system clock signal for generating internal CMOS level phase clock signals for its own use. As a result, the integrated circuit has a higher speed of operation since the propagation delay between the CMOS level system clock signal and internal clock signals has been minimized.

12 Claims, 4 Drawing Sheets

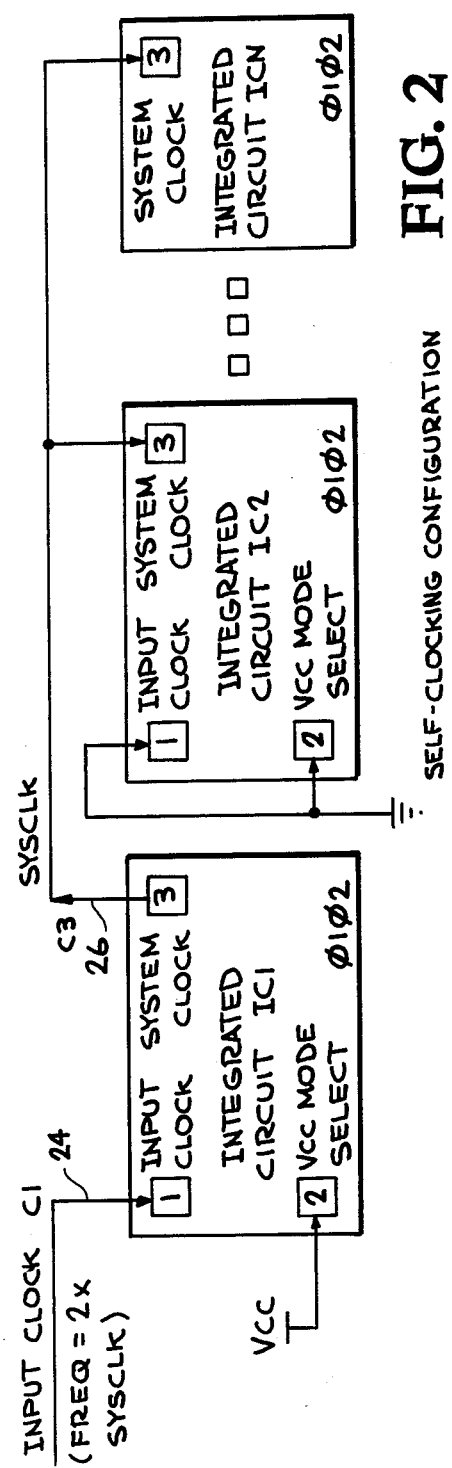
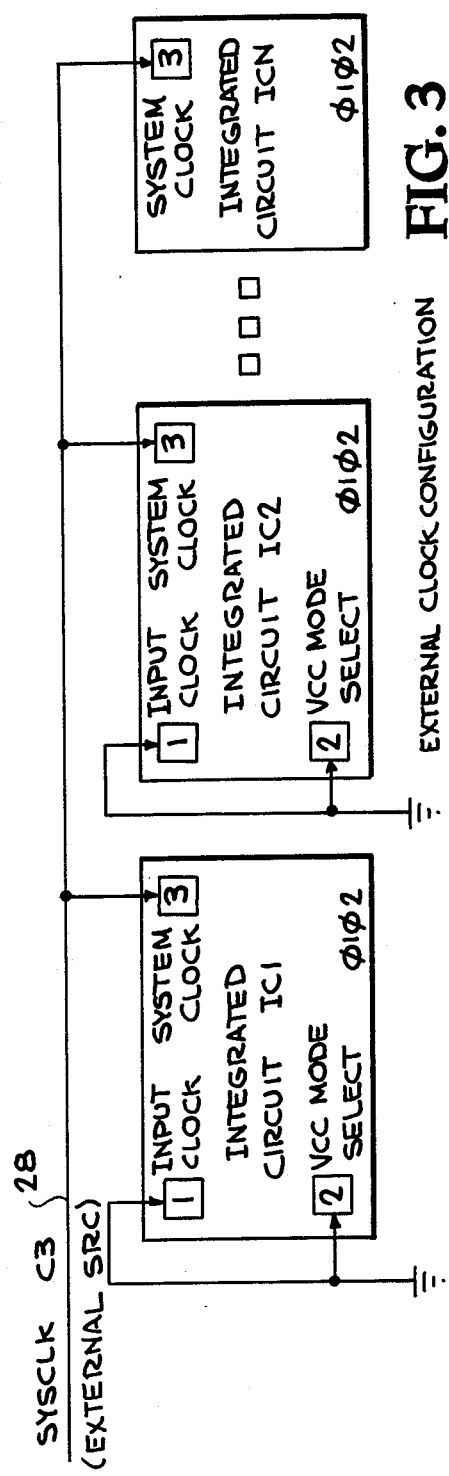

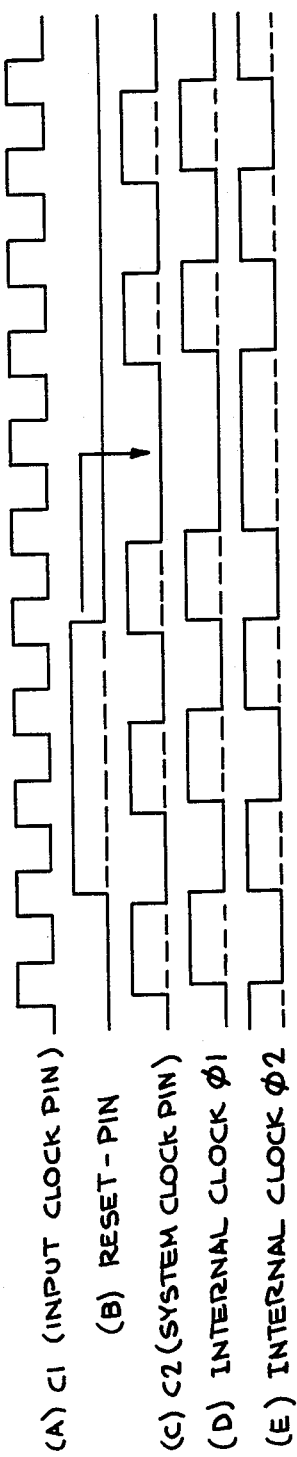
FIG. 5 CLOCK ELEMENT TIMING WITH SYSTEM CLOCK DRIVER ACTIVE.
(A) C1 (INPUT CLOCK PIN)
(B) RESET-PIN
(C) C2 (SYSTEM CLOCK PIN)
(D) INTERNAL CLOCK $\phi1$
(E) INTERNAL CLOCK $\phi2$
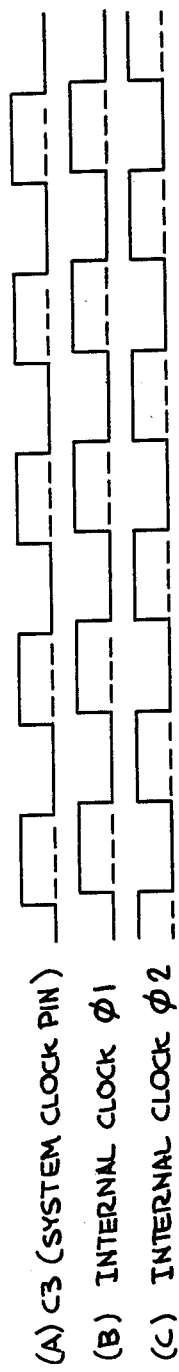
FIG. 6 CLOCK ELEMENT TIMING WITH EXTERNALLY SUPPLIED SYSTEM CLOCK.
(A) C3 (SYSTEM CLOCK PIN)
(B) INTERNAL CLOCK $\phi1$
(C) INTERNAL CLOCK $\phi2$

CLOCK SCHEME FOR VLSI SYSTEMS

BACKGROUND OF THE INVENTION

This invention relates generally to timing or clocking circuitry for use with integrated circuits and more particularly, it relates to an integrated circuit which includes an input clock generator circuit responsive to an external TTL level clock signal for generating an internal CMOS level system clock signal and an internal clock generator circuit responsive to either the internal CMOS level system clock signal or an external CMOS level system clock signal for generating internal CMOS phase clock signals.

There are several families of logic circuits which are available for use in implementing the various types of logic functions required in the operation of high speed microprocessors and other digital systems. For example, in conventional transistor-transistor-logic (TTL) the logic values corresponding to binary "1" and "0" are ordinarily represented by a high level voltage greater than 2.0 volts and a low level voltage less than 0.8 volts. On the other hand, complementary metal-oxide-semiconductor (CMOS) logic circuits have a larger voltage swing of 5 volts to 0 volts for the respective binary "1" and "0" states. Thus, these voltage levels are incompatible and an interface or buffer circuit is needed to perform the required voltage level translation. Further, since these various types of logic circuits are used many times in the timing and control of the different signals in the operation of the microprocessor, such various logic circuits require also their own clock signals. As a result, the different clock signals, such as the TTL level clock signals for the TTL logic circuitry and the CMOS level clock signals for the CMOS logic circuitry, are likewise incompatible.

Therefore, it is also generally required to provide interface circuits between the TTL level clock signals and the CMOS level clock signals in order to obtain the required compatibility therebetween. However, this process suffers from the disadvantage of increasing of the propagation delay each time a conversion is needed, effecting the integrated circuit performance in such areas as output signal delay and input data "hold time" when measured relative to the system clock. Another problem encountered with the TTL level clock signals is that they tend to become skewed, i.e., the duty cycle of the clock pulses are different from the 50% on-time and 50% off-time, thereby affecting its performance of operation.

It would therefore be desirable to provide an integrated circuit which includes an input clock generator circuit responsive to an external TTL level clock signal for generating an internal CMOS level system clock signal for its own use and for use by other integrated circuits and an internal clock generator circuit responsive to either the internal CMOS level system clock signal or an external CMOS level system clock signal for generating internal CMOS phase clock signals for its own use. As a result, there is achieved a higher speed of operation and the propagation delay between the external and internal clock signals has been minimized.

SUMMARY OF THE INVENTION

Accordingly, it is a general object of the present invention to provide an integrated circuit which is compatible with both an external TTL level clock signal or an external CMOS level system clock signal.

It is an object of the present invention to provide an integrated circuit which includes an input clock generator circuit responsive to an external TTL level clock signal for generating an internal CMOS level system clock signal for its own use and for use by other integrated circuits.

It is another object of the present invention to provide an integrated circuit which includes an internal clock generator circuit responsive to either an internal CMOS level system clock signal or an external CMOS level system clock signal for generating internal CMOS phase clock signals for its own use.

In accordance with these aims and objectives, the present invention is concerned with the provision of an integrated circuit which includes an input pad, an input clock generator circuit, an input/output pad, an enabling circuit, and an internal clock generator circuit. The input pad is connected to receive an external TTL level clock signal. The input clock generator circuit is responsive to the TTL level clock signal and generates an internal CMOS level system clock signal. The enabling circuit is used to selectively enable and disable the input clock generator circuit. The input/output pad is connected to receive the internal CMOS level system clock signal. The internal clock generator circuit is responsive to the internal CMOS level system clock signal for generating a first internal CMOS level phase clock signal signal and a second internal CMOS level phase clock signal which is complementary to the first internal CMOS phase clock signal when the input clock generator means is enabled. The input/output pad is also connected to receive an external CMOS level system clock signal when the input clock generator circuit is disabled. The internal clock generator circuit is responsive to the external CMOS level system clock signal for generating the first and second internal CMOS level phase clock signals when the input clock generator is disabled.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 2 is a block diagram of a plurality of the integrated circuits of FIG. 1, which are connected in a self-clocking configuration;

FIG. 3 is a block diagram of a plurality of the integrated circuits of FIG. 1, which are connected in a common external system clock configuration;

FIGS. 5(a)–5(e) are waveforms at various points in the circuit configuration of FIG. 2; and FIGS. 6(a)–6(c) are waveforms at various points in the circuit configuration of FIG. 3.

DESCRIPTION OF THE PREFERRED EMBODIMENTS

Figure 1:
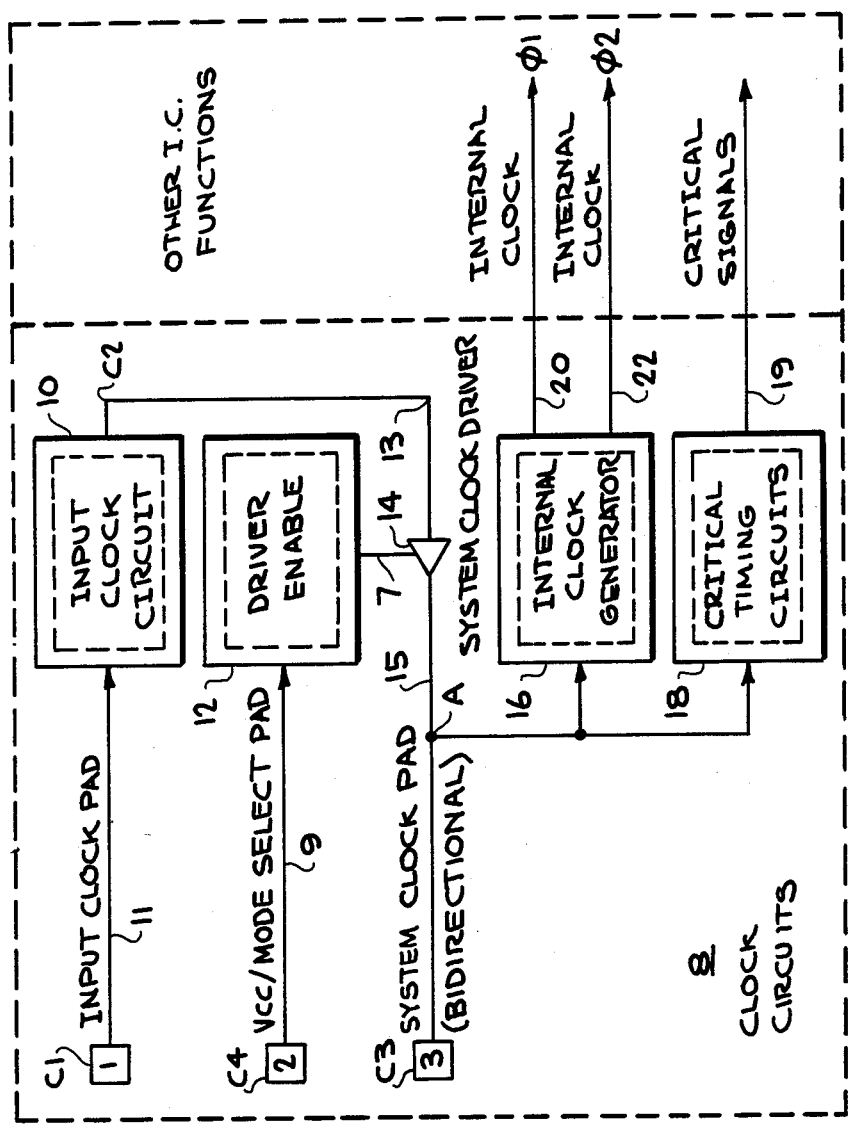
FIG. 1 is a block diagram of an integrated circuit constructed in accordance with the principles of the present invention.

Referring now to the drawings, there is shown in FIG. 1 a block diagram of a portion of an integrated circuit chip or device 8 constructed in accordance with the present invention. The integrated circuit device 8 includes an input pad 1 located on the periphery thereof for receiving an external TTL clock signal C1. The TTL level clock signal has a voltage swing between 0.8 volts and 2.0 volts and has a typical operating frequency between 16–70 MHz. The integrated circuit device also includes an input/output pad 3 located on the periphery thereof for transmitting an internally generated CMOS level system clock signal C2 for use by other integrated circuits when the external TTL level clock signal C1 is applied to the input pad 1. Thus, the pad 3 is functioning as an output pad in this condition. When the TTL level clock signal C1 is not being applied, the pad 3 is used to receive an external CMOS level system clock signal C3 from another integrated circuit device. Under this condition, the pad 3 is functioning as an input pad. The CMOS level clock signals C2 and C3 have a nominal voltage swing between 0 volts and 5.0 volts and have a typical operating frequency between 8–35 MHz with a 50% duty cycle. As can thus be seen, the CMOS level clock signals are operated at a frequency of one-half of the TTL level clock signal. However, it should be understood that the TTL level clock signal could be operated at the same frequency of 8–35 MHz as the CMOS level clock signals. Further, it should be understood that the TTL clock signals may be typically skewed in either direction from the 50% duty cycle.

The integrated circuit device or chip 8 includes an input clock generator circuit 10 which has its input connected to the input pad 1 by line 11 for receiving the external TTL level clock signal C1. The generator circuit 10 performs a level translation and converts the TTL level clock signal to the internally generated CMOS level system clock signal C2 with a 50% duty cycle on its output at line 13. The internal CMOS level system clock signal C2 on the line 13 is fed to the input of a clock generator driver circuit 14 which is used to amplify the same and feeds this clock signal C2 to the output pad 3 via line 15.

The integrated circuit device 8 further includes a clock output enable circuit 12 which has its input connected to an input pad 2 by a line 9 for receiving a control signal C4. The output enable circuit 12 is responsive to the control signal C4 and generates an output signal on line 7 for selectively enabling or disabling of the clock generator driver circuit 14. When the control signal C4 applied to the pad 2 is at a high level, the output signal on the line 7 will enable the operation of the generator driver circuit 14. When the control signal C4 applied to the pad 2 is at a low level, the output signal on the line 7 will disable the operation of the drive circuit 14. When the drive circuit 14 is enabled, the internally generated CMOS level system clock signal C2 is sent through the driver circuit 14 to the input/output pad 3 for transmitting the same for use by other integrated circuit devices.

The integrated circuit device 8 further includes an internal clock generator circuit 16 which has its input connected to a node A on the line 15 for receiving either the internally generated CMOS level system clock signal C2 when the driver circuit 14 is enabled, or the external CMOS level system clock signal C3 when the driver circuit 14 is disabled. Thus, the internal clock generator circuit 16 is responsive to either the system clock signal C2 or C3 dependent upon the mode of operation. The generator circuit 16 functions to produce a first internal CMOS level phase clock signal $\emptyset 1$ on line 20 and a second internal CMOS level phase clock signal $\emptyset 2$ on line 22 which is complementary to the phase clock signal $\emptyset 1$. The phase clock signals $\emptyset 1$ and $\emptyset 2$ are used by the other internal circuits located within the same integrated circuit chip 8.

The integrated circuit device 8 further includes timing circuitry 18 which receives also either the system clock signal C2 or C3. The timing circuit 18 is used to generate timing signals on line 19 for use by other internal circuits located on the same integrated circuit chip.

In a first mode of operation, the driver circuit 14 is enabled and the TTL level clock signal C1 is applied to the input pad 1. In this condition, the output of the generator circuit 10 is used to provide the internally generated CMOS level system clock signal C2 to the input/output pad 3 for driving other integrated circuit and to directly drive the inputs of the internal clock generator circuit 16 and the timing circuit 18. In a second mode of operation, the driver circuit 14 is disabled and the external CMOS level system clock signal C3 is applied to the input/output pad 3. In this condition, the external CMOS level system clock signal C3 is used to drive the inputs of the internal clock generator circuit 16 and the timing circuit 18.

In FIG. 2, there is shown a plurality of integrated circuits IC1, IC2, . . . ICN which are connected in a self-clocking configuration. Each of the integrated circuits IC2, . . . ICN is constructed identically to the integrated circuit chip or device 8 of FIG. 1 with pads 1, 2 and 3 or having only a system clock pad 3. The integrated circuit IC1 has its pad 1 connected to receive the external TTL level clock signal C1 on line 24. The integrated circuit IC1 has an input clock generator circuit 10 for producing the internally generated CMOS level system clock signal C2 which is sent out from its pad 3 to line 26. Each of the other integrated circuits IC2 through ICN receive on its pad 3 via the line 26 the CMOS level system clock signal C2 which is used to drive a corresponding internal clock generator circuit 16 and/or a timing circuit 18 located on each chip. The generator circuits 16 located on the integrated circuits IC2 through ICN are used to produce the CMOS level phase clock signals $\emptyset 1$ and $\emptyset 2$ for driving other internal circuits arranged on the same corresponding chips. As will be recalled, the integrated circuit IC1 also has an internal clock generator circuit 16 which receives the same CMOS level system clock signal C2 and is used to produce the CMOS level phase clock signals $\emptyset 1$ and $\emptyset 2$ for driving other internal circuits located within the chip IC1. Therefore, there will be a minimum delay between the CMOS level clock signal C2 or C3 on line 26 and the internal clocks (CMOS level system clock signals $\emptyset 1$, $\emptyset 2$ and the signals on line 19) on the various chips since each chip contains its own internal clock generator circuit 16 for producing the respective phase clock signals $\emptyset 1$ and $\emptyset 2$. In this self-clocking configuration, it will be noted that the pad 2 on the integrated circuit IC1 will be the only one that is enabled. The other remaining integrated circuits IC2 through ICN each has its pad 2 connected to a ground potential for disabling of its clock output enable circuit 12.

Reference is now made to FIGS. 5(A)–5(E) of the drawings which illustrate the waveforms appearing at various points in the self-clocking configuration of FIG. 2. The external TTL level clock signal C1 is applied to the pad 1 of the integrated circuit IC1 via the line 24 and is shown in FIG. 5(A). The internally generated CMOS level system clock signal C2 is produced on the pad 3 of the integrated circuit IC1 and the line 26. This clock signal C2 is illustrated in FIG. 5(C). The internal CMOS phase clock signals ∅1 and ∅2 on each of the chips IC1, IC2, ... ICN are depicted in FIGS. 5(D) and 5(E) respectively.

In FIG. 3, there are shown a plurality of integrated circuits IC1, IC2, ... ICN which are connected together in a common external clock configuration. Again, each of the integrated circuits IC1, IC2, ... ICN is constructed identically to the integrated circuit chip or device 8 of FIG. 1 with pads 1, 2 and 3 or having only a system clock pad 3. Each of the integrated circuits has its pad 3 connected to line 28 to receive the common external CMOS level system clock signal C3. The internal clock generator circuit 16 on each of the integrated circuits uses this clock signal C3 to produce the internal CMOS phase clock signal ∅1 and ∅2, thereby reducing propagation delay and clock skew between the various chips. In this common external clock configuration, it will be noted that the pad 2 on each of the integrated circuits will be connected to a low potential thereby disabling the same.

Reference is now made to FIGS. 6(A)–6(C) of the drawings which illustrate the waveforms appearing at various points in the common external clock configuration of FIG. 3. The common external CMOS level system clock signal C3 is applied to the pad 3 of each of the integrated circuits via the line 28 and is illustrated in FIG. 6(A). The internal CMOS phase clock signals ∅1 and ∅2 on each of the chips IC1, IC2, ... ICN are depicted in FIGS. 6(B) and 6(C), respectively.

Figure 4:
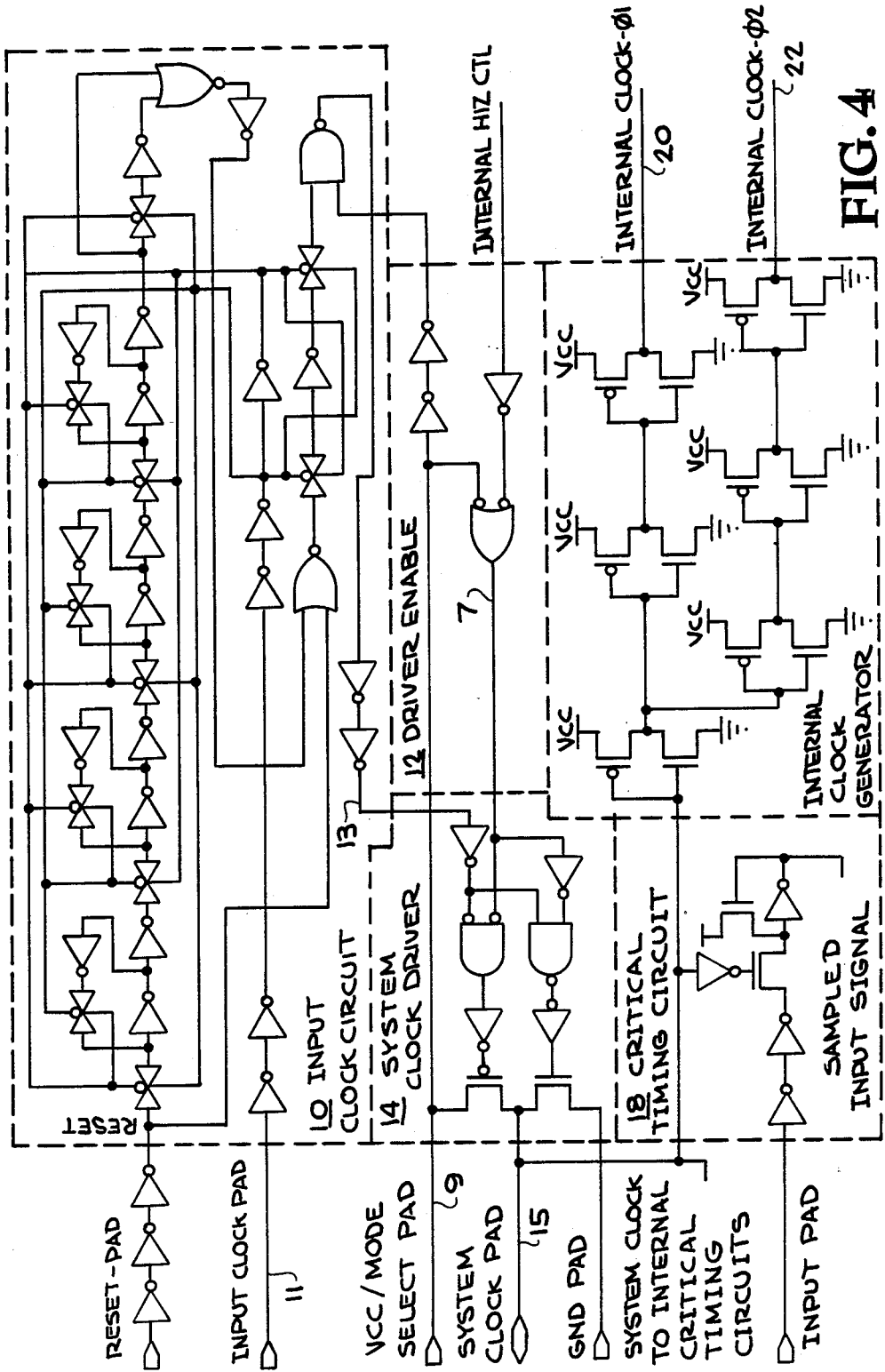
FIG. 4 is a schematic diagram showing suitable circuitry for use in certain blocks of FIG. 1.

While the various blocks of the input clock generator circuit 10, the clock output enable circuit 12, the clock generator driver circuit 14, the internal clock generator circuit 16, and the timing circuit 18 in FIG. 1 may take on various forms, suitable circuitry therefor is illustrated in FIG. 4. This detailed schematic circuit diagram is believed to be self-explanatory to those skilled in the art in view of the foregoing description and thus a detailed discussion of the operation of each block is believed to be unnecessary.

From the foregoing detailed description, it can thus be seen that the present invention provides an integrated circuit which includes an input clock generator circuit responsive to an external TTL level clock signal for generating an internal CMOS level system clock signal and an internal clock generator circuit responsive to either the internal CMOS level system clock signal or an external CMOS level system clock signal for generating internal CMOS phase clock signals. The integrated circuit of the present invention has a high speed of operation since the propagation delay time between the external and internal clock signals has been minimized.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An integrated circuit comprising:
   an input pad connected to receive a first external clock signal;
   input clock generator means responsive to said first clock signal for generating an internal system clock signal;
   means for selectively enabling or disabling of said input clock generator means;
   input/output pad connected to receive said internal system clock signal and to provide said internal system clock signal to other integrated circuits;
   internal clock generator means being responsive to said internal system clock signal for generating a first internal phase clock signal and a second internal phase clock signal which is complementary to the first internal phase clock signal when said input clock generator means is enabled;
   said input/output pad being further connected to receive a second external system clock signal when said input clock generator means is disabled; and
   said internal clock generator means being responsive to said second external system clock signal for generating said first and second internal phase clock signals when said input clock generator means is disabled.

2. An integrated circuit as claimed in claim 1, wherein said input clock generator means comprises an input clock generator circuit having an input and an output and a clock generator driver circuit having an input and an output.

3. An integrated circuit as claimed in claim 2, wherein said input clock generator circuit has its input connected to said input pad, and wherein said clock generator driver circuit has its input connected to the output of said input clock generator circuit and has its output connected to said input/output pad.

4. An integrated circuit as claimed in claim 1, wherein said internal clock generator means comprises an internal clock generator circuit.

5. An integrated circuit as claimed in claim 1, wherein said means for selectively enabling or disabling of said input clock generator means comprises a clock output enable circuit.

6. An integrated circuit as claimed in claim 1, wherein said first external clock signal is a TTL level clock signal.

7. An integrated circuit as claimed in claim 6, wherein said internal clock signal is a CMOS level system clock signal.

8. An integrated circuit as claimed in claim 7, wherein said second external clock signal is a common CMOS level system clock signal.

9. An integrated circuit as claimed in claim 1, further comprising timing circuit means responsive to either said internal clock signal or said second external clock signal.

10. An integrated circuit comprising:
    an input pad connected to receive an external TTL level clock signal;
    input clock generator means responsive to said TTL level clock signal for generating an internal CMOS level system clock signal;
    means for selectively enabling or disabling of said input clock generator means;

input/output pad connected to receive said internal CMOS level system clock signal and to provide said internal system clock signal to other integrated circuits;

internal clock generator means being responsive to said internal CMOS level system clock signal for generating a first internal CMOS level phase clock signal and a second internal CMOS level phase clock signal which is complementary to the first internal CMOS level phase clock signal when said input clock generator means is enabled;

said input/output pad being further connected to receive a common external CMOS level system clock signal when said input clock generator means is disabled; and said internal clock generator means being responsive to said common external CMOS level system clock signal for generating said first and second internal CMOS level phase clock signals when said input clock generator means is disabled.

11. An integrated circuit as claimed in claim 10, further comprising a plurality of integrated circuits connected in a self-clocking configuration so that one of the integrated circuits is responsive to the TTL level clock signal for producing the internal CMOS level system clock signal and the remaining integrated circuits are responsive to the internal CMOS level system clock signal.

12. An integrated circuit as claimed in claim 10, further comprising a plurality of integrated circuits connected in a common external clock configuration so that each of said plurality of integrated circuits is responsive to the common external CMOS level system clock signal.

* * * * *